United States Patent
Kangas et al.

(10) Patent No.: US 8,115,607 B2
(45) Date of Patent: Feb. 14, 2012

(54) MICROPHONE DIAGNOSTIC INSIDE SYSTEM WITH VOIP ALERTING AND MONITORING

(75) Inventors: Paul Daniel Kangas, Cary, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 12/208,075

(22) Filed: Sep. 10, 2008

(65) Prior Publication Data

US 2010/0060436 A1 Mar. 11, 2010

(51) Int. Cl.
*G08B 3/10* (2006.01)

(52) U.S. Cl. .......... 340/384.5; 340/679; 381/56; 714/48

(58) Field of Classification Search ............... 340/384.5, 340/679, 682, 683, 678; 381/56; 714/48
See application file for complete search history.

(56) References Cited

U.S. PATENT DOCUMENTS

| | | | |
|---|---|---|---|
| 7,091,832 B1 * | 8/2006 | Butterman et al. | 340/384.72 |
| 7,420,474 B1 * | 9/2008 | Elks et al. | 340/678 |
| 2002/0101854 A1 | 8/2002 | Siegrist et al. | |
| 2004/0064762 A1 | 4/2004 | Deshpande et al. | |
| 2004/0136539 A1 | 7/2004 | Uhi et al. | |
| 2006/0107088 A1 | 5/2006 | Katayama et al. | |
| 2007/0036276 A1 | 2/2007 | Tanimoto | |
| 2008/0147356 A1 * | 6/2008 | Leard et al. | 702/183 |

FOREIGN PATENT DOCUMENTS

JP 2307023 12/1990

* cited by examiner

*Primary Examiner* — Jennifer Mehmood
*Assistant Examiner* — Hongmin Fan
(74) *Attorney, Agent, or Firm* — Yee & Associates, P.C.; Tom Tyson (57) ABSTRACT

A computer implemented method, computer program product and a data processing system acoustically monitor an internal data processing system component. The internal data processing system component is selected for diagnosis. The internal data processing system component is within the data processing system and has an associated microphone located proximate to the component. The microphone associated with the internal data processing system component is enabled, and an acoustic signal for the internal data processing system component is identified. An exemplar fingerprint for the internal data processing system component is then identified from storage. A determination is then made as to whether the acoustic signal deviates from the exemplar fingerprint by more than a defined statistical variance. If the acoustic signal deviates from the exemplar fingerprint by more than a defined statistical variance, the acoustic signal and an identity of the internal data processing system component is stored in a failure log and a failure notification is triggered.

17 Claims, 4 Drawing Sheets

MICROPHONE DIAGNOSTIC INSIDE SYSTEM WITH VOIP ALERTING AND MONITORING

BACKGROUND OF THE INVENTION

1. Field of the Invention

The present invention relates generally to a computer implemented method, a computer program product, and a data processing system. More specifically, the present invention relates generally to a computer implemented method, a computer program product, and a data processing system for the acoustic monitoring of internal data processing system components.

2. Description of the Related Art

Computer networks allow increased computing power, sharing of resources, and communications between users. These networks have grown to represent large investments on the parts of businesses, governments, and educational institutions and these organizations spend large amounts of time and money maintaining their networks. According to industry research, an average 5000-user corporate network costs more than $6.4 million to support each year. Thus, to many network decision makers the real concern, as we head into the 21st century, is not so much migrating to faster technologies, such as asynchronous transfer mode (ATM), but reducing the costs associated with supporting and operating the networks they use today.

One of the principle costs associated with maintaining a network is the time spent on system management. Networks are not static systems. As companies and organizations grow and change, so do their networks. Thus, network devices are constantly being added or replaced to meet the changing needs of the people using the network. When new devices are added or old ones replaced, the new devices need to be integrated into the Fault Management System. A Fault Management System monitors the hardware portions and software applications of the network for failures. Currently, this involves reprogramming various aspects of the network to ensure that all aspects of the network function correctly.

Service processor sensors are useful for communicating hardware level failure alerts. However, for each specific component that one is interested in monitoring, the failure mode must be known. Additionally, a circuit must then be designed to sense the failure.

BRIEF SUMMARY OF THE INVENTION

According to one embodiment of the present invention, a computer implemented method, computer program product and a data processing system to acoustically monitor an internal data processing system component is provided. The internal data processing system component is selected for diagnosis. The internal data processing system component is within the data processing system and has an associated microphone located proximate to the component. The microphone associated with the internal data processing system component is enabled, and an acoustic signal for the internal data processing system component is identified. An exemplar fingerprint for the internal data processing system component is then identified from storage. A determination is then made as to whether the acoustic signal deviates from the exemplar fingerprint by more than a defined statistical variance. If the acoustic signal deviates from the exemplar fingerprint by more than a defined statistical variance, the acoustic signal and an identity of the internal data processing system component is stored in a failure log and a failure notification is triggered.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
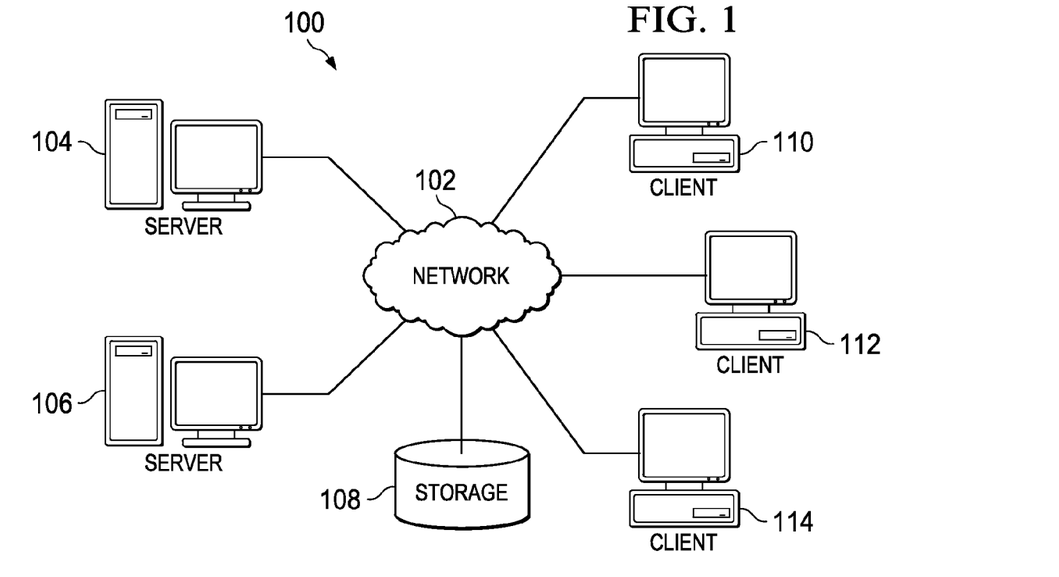
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
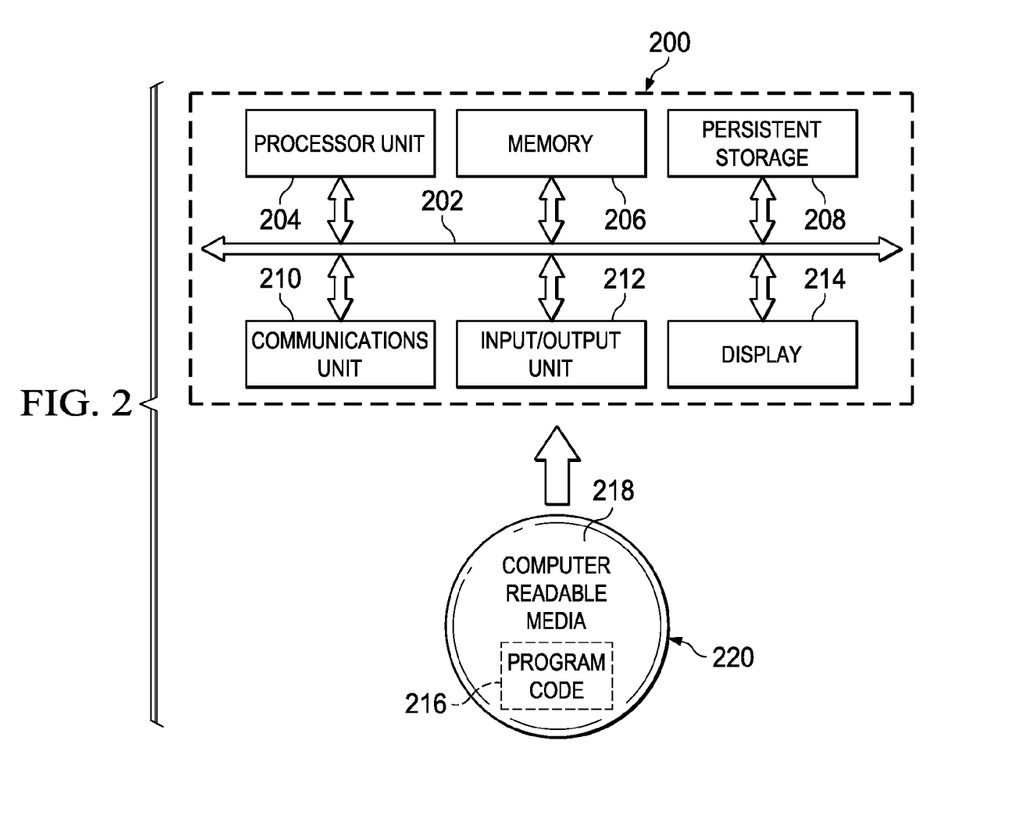
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiment described herein provide a computer implemented method, computer program product and a data processing system for acoustically monitoring an internal data processing system component. The internal data processing system component is selected for diagnosis. The internal data processing system component is within the data processing system and has an associated microphone located proximate to the component. The microphone associated with the internal data processing system component is enabled, and an acoustic signal for the internal data processing system component is identified. An exemplar fingerprint for the internal data processing system component is then identified from storage. A determination is then made as to whether the acoustic signal deviates from the exemplar fingerprint by more than a defined statistical variance. If the acoustic signal deviates from the exemplar fingerprint by more than a defined statistical variance, the acoustic signal and an identity of the internal data processing system component is stored in a failure log and a failure notification is triggered.

Figure 3:
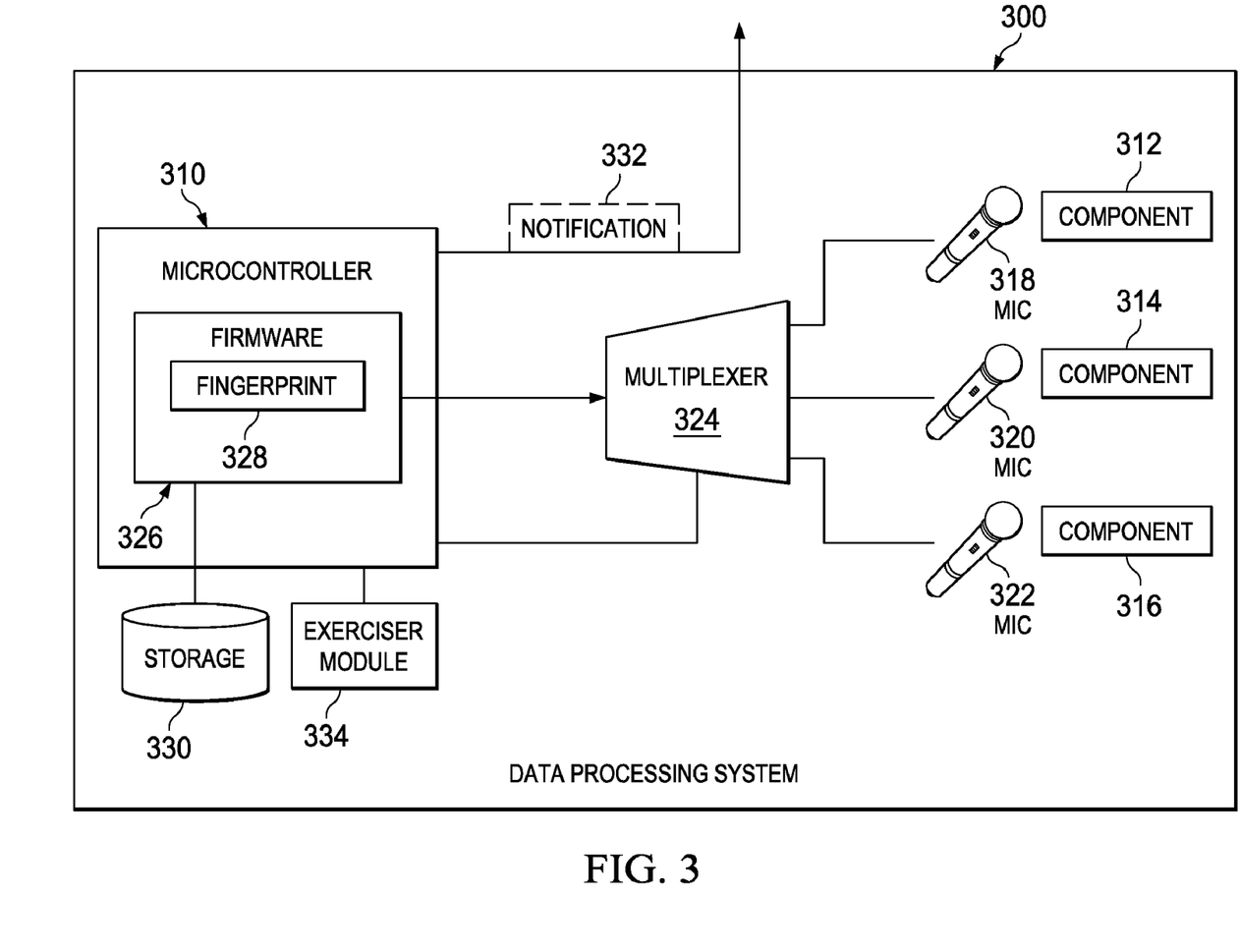
FIG. 3 is a data flow between the various software and hardware components according to an illustrative embodiment.

Referring now to FIG. 3, a data flow between the various software and hardware components is shown according to an illustrative embodiment. Data processing system 300 can be data processing system 100 of FIG. 1. Data processing system 300 includes microcontroller 310, which can be processor unit 204 of FIG. 2.

Data processing system 300 is connected to data processing system 305 via multiplexer 324 and network 334. Data processing system 305 includes components 312, 314, and 316.

It should be understood that components 312, 314, and 316 are shown on a single computer, data processing system 305, for ease of illustration only. Each of components 312, 314, and 316, along with microphones 318, 320, and 322, such that a single monitoring computer, such as data processing system 300, can be used to acoustically monitor a plurality of data processing systems, such as data processing system 305.

Components 312, 314, and 316 are noise producing components within data processing system 300. Components 312, 314 and 316 can be cooling devices, such as fans. Components 312, 314, and 316 can be magnetic or optical storage devices, such as hard disk drives, CD-ROM drives, or DVD-ROM drive components 312, 314, and 316 can also be power supply units, communications modules and network connections.

Coupled to, or placed in close proximity of components 312, 314, and 316 are microphones 318, 320, and 322. Microphones 318, 320, and 322 detect sound from components 312, 314, and 316. An acoustic signal is produced by microphones 318, 320, and 322 in response to detecting sound from components 312, 314, and 316.

Microphones 318, 320, and 322 are connected to multiplexer 325. Multiplexers 324 and 325 allows for selection of the various acoustic signals from each of microphones 318, 320, and 322. Multiplexers 324 and 325 allow the multiple signals from microphones 318, 320, and 322 to share microcontroller 310. Multiplexers 324 and 325 can utilize any known multiplexing methodology, including, for example, but not limited to, frequency-division multiplexing (FDM), time-division multiplexing (TDM), and dense wavelength division multiplexing (DWDM).

In one illustrative embodiment, the acoustic signal is sent between data processing system 305 and data processing system 300 using a voice over internet protocol, or VOIP. Voice over internet protocol involves sending voice information in digital form in discrete packets rather than by using the traditional circuit-committed protocols of the public switched telephone network.

Microcontroller 310 of data processing system 300 includes firmware 326. Firmware 326 is a computer program product that is embedded in microcontroller 310. Firmware 326 can be provided on flash electrically erasable programmable read-only memory (EEPROM) or as a binary image file that can be uploaded onto existing hardware by a user.

Firmware 326 controls the monitoring and selection of one of microphones 318, 320, and 322. Firmware 326 also controls the comparison of generated audio signals to the acoustic fingerprints.

The acoustic signal may undergo a Fourier transformation, or other digital transformation, to create an acoustic fingerprint. The acoustic fingerprint can be a spectral representation of the acoustic signal. Characteristics of the transformed acoustic signal are isolated from the fingerprint. Alternatively, firmware 326 can convert the acoustic signal using a hash method to obtain the acoustic fingerprint as a compact representation of the acoustic signal.

Firmware 326 retrieves exemplar fingerprint 328 from storage 330. Exemplar fingerprint 328 is an idealized acoustic fingerprint taken from one of components 312, 314, or 316, under specified operating conditions, and compared to known sample statistical models of exemplar fingerprints to determine similarities using known methods, such as vector quantization, hidden Markov modeling, and multivariate autoregression modeling.

Storage 330 can be either memory 206 of FIG. 2 or persistent storage 208 of FIG. 2. Storage 330 stores exemplar fingerprint 328. Storage 330 can store a different exemplar fingerprint 328 for each component 312, 314, or 316 under a variety of operating conditions in a data structure, or other data store.

Exemplar fingerprint 328 may also include some defined statistical variance from exemplar fingerprint 328. The defined statistical variance is a deviation by which an acoustic signal may differ from exemplar fingerprint 328 without triggering a notification.

If firmware 326 determines that the acoustic signal has deviated from exemplar fingerprint 328 by more than the defined statistical variance, firmware 326 provides notification 332 to a user or other person that the acoustic signal is no longer within normal operating parameters defined by the exemplar fingerprint 328. Notification 332 can be provided in a number of different ways. For example, notification 332 can be provided by an auditory or visual alarm, such as a siren, or a light emitting diode indicator. Notification 332 also can be an email or short messaging service formatted (text message) alert sent to a user at a mobile or desktop data processing system, such as one of clients 110-114 of FIG. 1.

In one illustrative embodiment, notification 332 can be a remote management network alert for a systems management of distributed clients. A remote management network alert helps to frame the context of the microphone diagnostic in a service processor type environment which communicates diagnostic information out of band to a service management computing server. The service management computing server could be, for example, one of servers 104 and 106 of FIG. 1. This remote management network alert is powered independently of, and operates independently of, a client's power supply and program code. The service management computing server can even have its own physical network connection.

In one preferred embodiment, a user is provided with a user interface to access micro-controller 310. Through a user interface, a user can adjust the defined statistical variance for exemplar fingerprint 328. Through a user interface, a user may also be able to reset exemplar fingerprint 328 to correspond to a current acoustic signal. The user interface may also provide an output for notification 332, such that a user can determine whether an acoustic signal deviates from exemplar fingerprint 328 by more than the defined statistical variance by examining the user interface.

Subsystem exerciser module 334 of FIG. 3 is software that operates the device and could be diagnostics software, such as, for example, a hard disk drive. This subsystem exerciser module individually exercises parts of the client system so as to record a known good sound profile fingerprint, and to exercise the parts again to perform the sound comparison with known good sound template.

Figure 4:
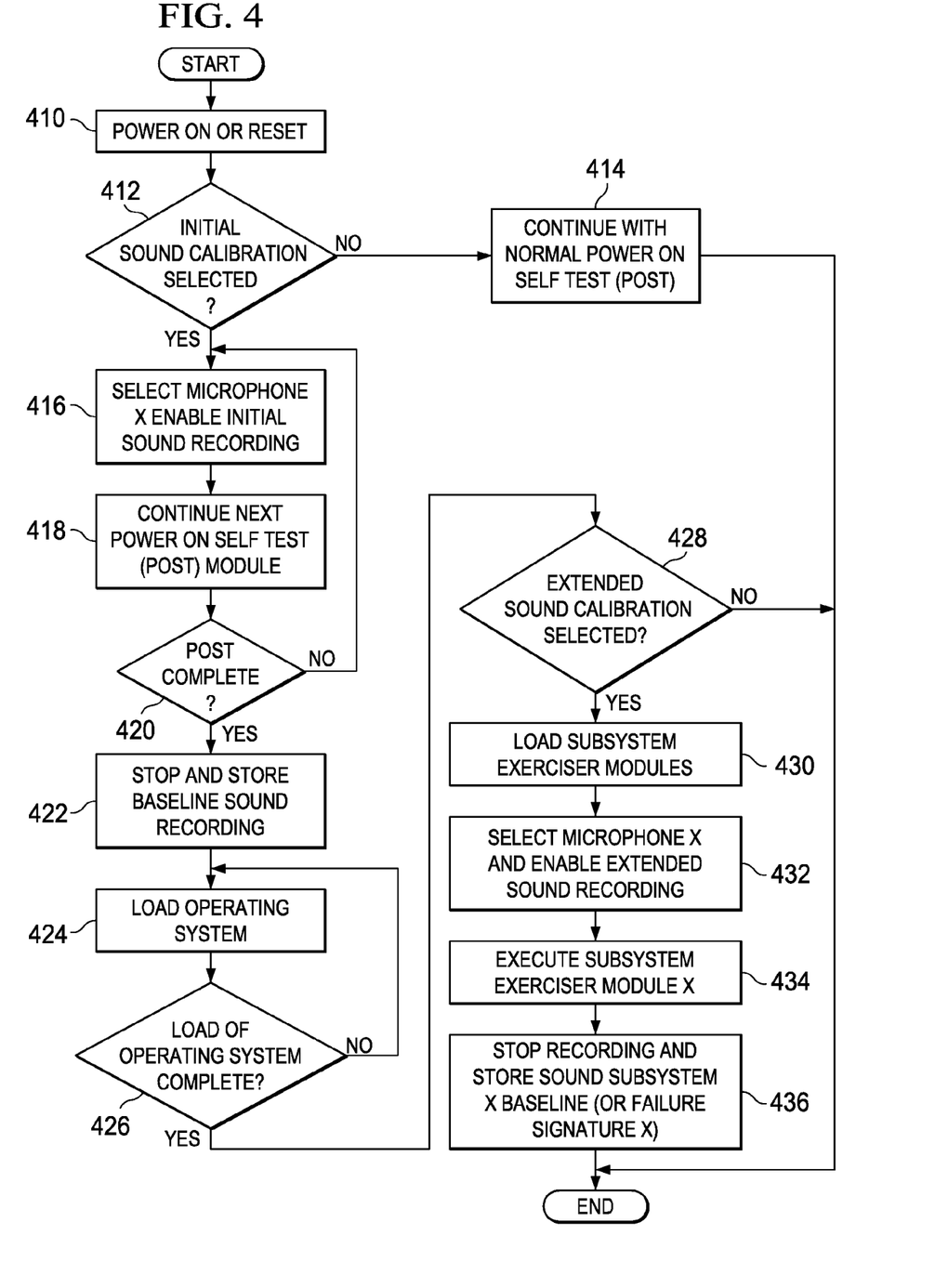
FIG. 4 is a flowchart of a process for calibrating a computer implemented diagnostic system according to an illustrative embodiment.

Referring now to FIG. 4, a flowchart of a process for calibrating a computer implemented diagnostic system is shown according to an illustrative embodiment. Process 400 is a software or firmware process, executing on a microcontroller, such as microcontroller 310 of FIG. 3.

Process 400 begins when the data processing system is powered on or reset (step 410). Responsive to the system being powered on or reset, process 400 identifies whether an initial sound calibration is selected (step 412). The initial sound calibration establishes exemplar fingerprints, such as exemplar fingerprint 328 for at least one of the sound producing components of the data processing system during the boot sequence, such as components 312, 314, and 316 of FIG. 3.

Responsive to process 400 not identifying that the initial sound calibration is selected ("no" at step 412), process 400 passes control to the system BIOS for conducting a normal power-on, self-test (step 414), with the process terminating thereafter. The power-on, self test (POST) is a pre-boot sequence undergone by the data processing system. The power-on, self-test can include actions, such as, for example, but not limited to, verifying the integrity of the BIOS code, finding, sizing, and verifying system main memory, discovering, initializing, and cataloging all system buses and devices, providing a user interface for system configuration, identifying, organizing, and selecting which devices are available for booting, and constructing whichever system environment that is required by the target operating system.

Responsive to process 400 identifying that the initial sound calibration is selected ("yes" at step 412), process 400 selects a microphone, and enables initial sound recording (step 416). The selected microphone is one of microphones 318, 320, and 322 of FIG. 3. The prerecording of the selected microphone during the boot process of the data processing system establishes an exemplar fingerprint for the associated component during the boot process. In one illustrative embodiment, the user may select a plurality of microphones implemented within a data processing system. Selection of a plurality of microphones will establish a composite fingerprint. The composite fingerprint is an idealized acoustic fingerprint taken from a plurality of components of the data processing system, such as components 312, 314, or 316 of FIG. 3.

Responsive to selecting a microphone, and enabling initial sound recording, process 400 passes control to the system BIOS for conducting a normal power-on, self-test for the selected module, and polls for completion of the boot process (step 418). The normal power-on, self-test is identical to the normal power-on, self-test of step 412, except that the selected component is being monitored to establish baseline exemplar fingerprint for the boot process. During the normal power-on, self-test, individual microphones can be selected during each module of the normal power-on, self-test. For example, when a hard disk drive initialization takes place, a microphone associated with the hard disk drive is selected to record hard disk drive sounds. When a CD-ROM initialization takes place, a microphone associated with the CD-ROM is enabled during that time period. This selective enabling of microphones continues throughout the power-on, self-test. Therefore, during the power-on, self-test, it is possible to select different microphones associated with different components in order to get separate sound fingerprints for each of those components, and not just one system wide fingerprint obtained for the entire power-on, self-test.

Process 400 then identifies whether the power-on, self-test is complete (step 420). Responsive to not identifying that the power-on, self-test is complete ("no" at step 420), process 400 returns to step 416.

Responsive to identifying that the power-on, self-test is complete ("yes" at step 420), process 400 stops initial sound recording and stores the baseline sound recording (step 422). The baseline sound recording is stored as an exemplar fingerprint, such as exemplar fingerprint 328 of FIG. 3.

Responsive to stopping initial sound recording and storing the baseline sound recording, process 400 passes control back to the BIOS for loading of the operating system (step 424). The operating system is the software component of the data processing system that is responsible for the management and coordination of activities and the sharing of the resources of the data processing system.

Responsive to passing control back to the BIOS for loading of the operating system, process 400 then identifies whether the loading of the operating system is complete (step 426). Responsive to not identifying that the loading of the operating system is complete ("no" at step 426), process 400 returns to step 424.

Responsive to identifying that the loading of the operating system is complete ("yes" at step 426), process 400 identifies whether an extended sound calibration is selected (step 428). The extended sound calibration establishes exemplar fingerprints, such as exemplar fingerprint 328 for at least one of the sound producing components of the data processing system during operating conditions, such as at least one of components 312, 314, and 316 of FIG. 3. Responsive to process 400 not identifying that an extended sound calibration is selected ("no" at step 428), process 400 terminates.

Responsive to process 400 identifying that an extended sound calibration is selected ("yes" at step 428), process 400 loads a subsystem exerciser module (step 430). The subsystem exerciser module is a software process that simulates various operating conditions on a selected component. The subsystem exerciser module can be subsystem exerciser module 334 of FIG. 3. The subsystem exerciser module is software that operates the device and could be diagnostics software, such as, for example, a hard disk drive. This subsystem exerciser module individually exercises parts of the client system so as to record a known good sound profile fingerprint, and to exercise the parts again to perform the sound comparison with a known good sound template.

Responsive to loading the subsystem exerciser module, process 400 selects a microphone and enables extended sound recording (step 432). The selected microphone is one of microphones 318, 320, and 322 of FIG. 3. The prerecording of the selected microphone during the boot process of the data processing system establishes an exemplar fingerprint for the associated component during the subsystem exerciser module simulating various operating conditions.

In one illustrative embodiment, the subsystem exerciser software can be run to create again a more extensive fingerprint template file of longer sound duration, or more complex sound profile from exercising the subsystem more strenuously, for example a Hard Disk Drive. Multiple sound exemplar finger print templates can therefore be created, with one exemplar fingerprint for the power on self test, and a different exemplar fingerprint corresponding to the running of the individual subsystem exerciser software.

Responsive to selecting a microphone and enabling extended sound recording, process 400 executes the subsystem exerciser module (step 434). The subsystem exerciser module executes various normal operating conditions on a selected component, causing that component to generate noise that is typical of those various operating conditions. The various noises are captured from the component as an exemplar fingerprint, such as exemplar fingerprint 328 of FIG. 3.

Process 400 then ends the subsystem exerciser module and stores the exercised sound recording (step 436), with the process terminating thereafter. The exercised sound recording is stored as an exemplar fingerprint, such as exemplar fingerprint 328 of FIG. 3.

Figure 5:
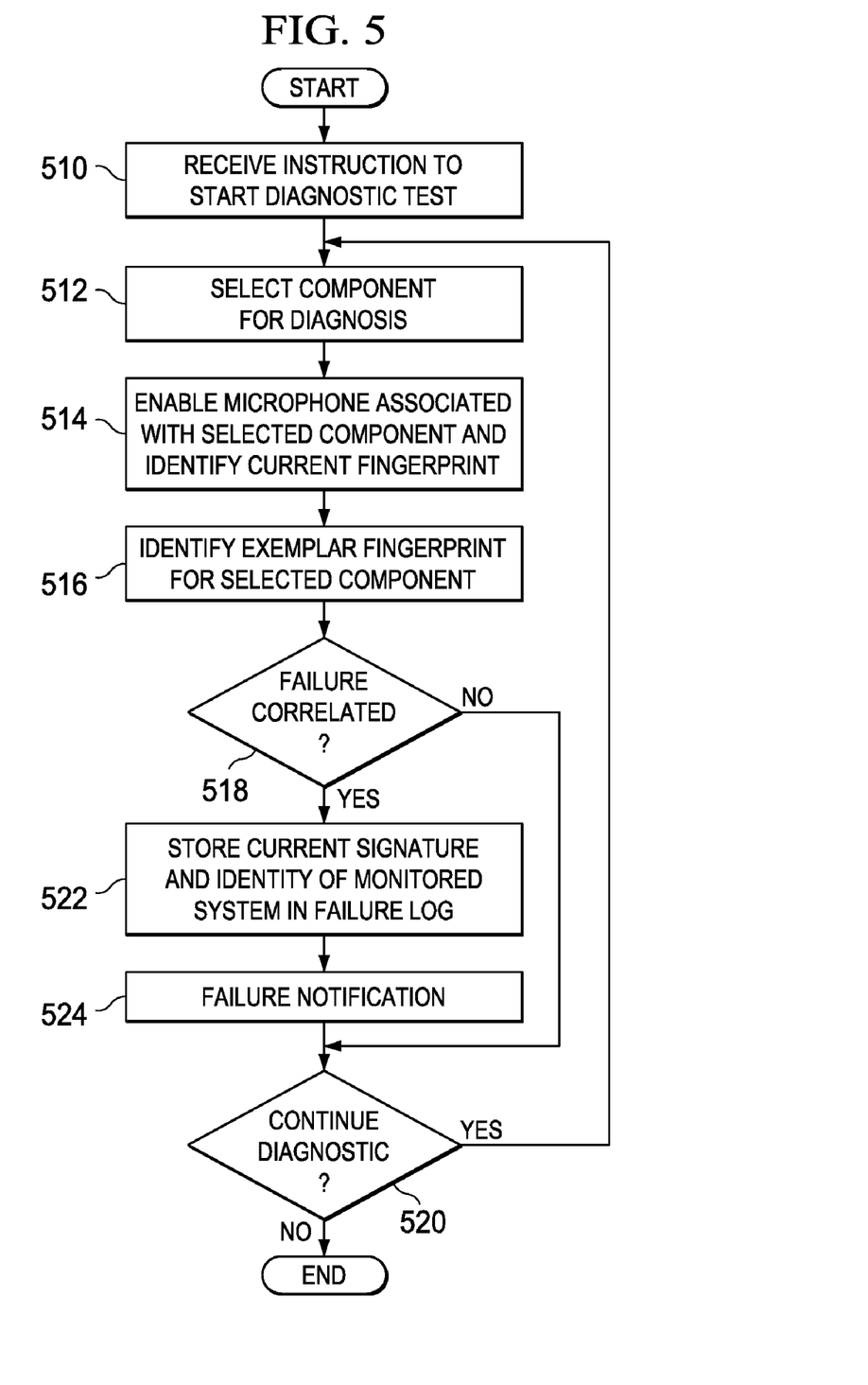
FIG. 5 is a flowchart for a process of running a diagnostic test on a component of a data processing system according to an illustrative embodiment.

Referring now to FIG. 5, a flowchart for a process of running a diagnostic test on a component of a data processing system is shown according to an illustrative embodiment. Process 500 is a software or firmware process, executing on a microcontroller, such as microcontroller 310 of FIG. 3.

Process 500 begins by receiving an instruction to start a diagnostic test (step 510). The diagnostic test is a sound enabled diagnostic of a component of a data processing system, such as one of components 312, 314, and 316 of FIG. 3.

Responsive to receiving the instruction to start a diagnostic test, process 500 selects a component for diagnosis (step 512), such as one of components 312, 314, and 316 of FIG. 3. Responsive to selecting the component for diagnosis, process 500 enables the microphone associated with the selected component, and identifies a current fingerprint for that selected component (step 514).

Responsive to enabling the microphone associated with the selected component, and identifying a current fingerprint for that selected component, process 500 identifies the exemplar fingerprint for that component (step 516).

Responsive to identifying the exemplar fingerprint for that selected component, process 500 correlates a failure (step 518). A failure is correlated by comparing the current fingerprint with the exemplar fingerprint to identify if the current fingerprint deviates from the exemplar fingerprint by more than a defined statistical variance. The statistical variance is the expected amount of deviation from the exemplar fingerprint. Responsive to not correlating a failure ("no" at step 518), process 500 identifies whether the diagnostic should be continued (step 520). If the diagnostic is to be continued ("yes" at step 520), process 500 iterates back to step 512. If the diagnostic is not to be continued ("no" at step 520), the process terminates.

Returning now to step 518, responsive to process 500 correlating a failure ("yes" at step 518), process 500 stores the current signature and the identity of the monitored system in a failure log (step 522). Process 500 then triggers a failure notification. (step 524). The failure notification can be notification 332 of FIG. 3. The failure notification can be provided in a number of different ways. For example, the notification can be provided an auditory or visual alarm, such as a siren, or a light emitting diode indicator, or electrical signaling to system management software running on the client or over the network to a remote management computing server for remote diagnostics and monitoring of system failures. The notification also can be an email or short messaging service formatted (text message) alert sent to a user at a mobile or desktop data processing system, such as one of clients 110-114 of FIG. 1.

Process 500 then identifies whether the diagnostic should be continued (step 520). If the diagnostic is to be continued ("yes" at step 520), process 500 iterates back to step 512. If the diagnostic is not to be continued ("no" at step 520), the process terminates.

Thus, the illustrative embodiment described herein provide a computer implemented method, computer program product and a data processing system for acoustically monitoring an internal data processing system component. The internal data processing system component is selected for diagnosis. The internal data processing system component is within the data processing system and has an associated microphone located proximate to the component. The microphone associated with the internal data processing system component is enabled, and an acoustic signal for the internal data processing system component is identified. An exemplar fingerprint for the internal data processing system component is then identified from storage. A determination is then made as to whether the acoustic signal deviates from the exemplar fingerprint by more than a defined statistical variance. If the acoustic signal deviates from the exemplar fingerprint by more than a defined statistical variance, the acoustic signal and an identity of the internal data processing system component is stored in a failure log and a failure notification is triggered.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The specified functions my be located on the client system and executed locally, or located on the remote computing server to perform the initial fingerprint template recording and diagnostics remotely via a computer network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for the acoustic monitoring of an internal data processing system component, the method comprising the computer implemented steps of:
   selecting the internal data processing system component for diagnosis, wherein the internal data processing system component is within the data processing system, wherein the internal data processing system component has a microphone associated with the internal data processing system component, the microphone associated with the internal data processing system component being located proximate to the component;
   responsive to selecting an internal component for diagnosis, enabling the microphone associated with the internal data processing system component;

responsive to enabling the microphone associated with the internal data processing system component, identifying an acoustic signal for the internal data processing system component;

identifying an exemplar fingerprint for the internal data processing system component, wherein the exemplar fingerprint is selected from the group consisting of the exemplar fingerprint of a power-on self-test, and the exemplar fingerprint established during a running of an exerciser software for the internal data processing system component;

responsive to identifying both the acoustic signal for the internal data processing system component and the exemplar fingerprint for the internal data processing system component, identifying whether the acoustic signal deviates from the exemplar fingerprint by more than a defined statistical variance;

responsive to identifying that the acoustic signal deviates from the exemplar fingerprint by more than the defined statistical variance, storing the acoustic signal and an identity of the internal data processing system component in a failure log; and triggering a failure notification.

2. The computer implemented method of claim 1, further comprising the computer implemented steps of:
capturing the exemplar fingerprint during a running of the exerciser software for the internal data processing system component.

3. The computer implemented method of claim 1, further comprising the computer implemented steps of:
capturing the exemplar fingerprint during the power-on self-test for the data processing system.

4. The computer implemented method of claim 1, wherein the internal data processing system component is a plurality of internal data processing system components, the microphone is a plurality of microphones, the acoustic signal is a composite acoustic signal, and the exemplar fingerprint is a composite exemplar fingerprint, wherein the computer implemented method further comprises:
selecting the plurality of internal data processing system components for diagnosis, wherein each of the plurality of internal data processing system components are within the data processing system, wherein each of the plurality of the internal data processing system components has one of a plurality of microphones associated with each of the plurality of the internal data processing system components, each of the plurality of microphones being located proximate to the associated each of the plurality of the internal data processing system components.

5. A non-transitory computer usable medium having computer usable program product for the acoustic monitoring of an internal data processing system component embodied therewith, the computer usable program product comprising:
first instructions for selecting the internal data processing system component for diagnosis, wherein the internal data processing system component is within the data processing system, wherein the internal data processing system component has an associated microphone located proximate to the component;
second instructions, responsive to selecting an internal component for diagnosis, for enabling the microphone associated with the internal data processing system component;
third instructions, responsive to enabling the microphone associated with the internal data processing system component, for identifying an acoustic signal for the internal data processing system component;
fourth instructions for identifying an exemplar fingerprint for the internal data processing system component, wherein the exemplar fingerprint is selected from the group consisting of the exemplar fingerprint of a power-on self-test, and the exemplar fingerprint established during a running of an exerciser software for the internal data processing system component;
fifth instructions, responsive to identifying both the acoustic signal for the internal data processing system component and the exemplar fingerprint for the internal data processing system component, for identifying whether the acoustic signal deviates from the exemplar fingerprint by more than a defined statistical variance;
sixth instructions, responsive to identifying that the acoustic signal deviates from the exemplar fingerprint by more than the defined statistical variance, for storing the acoustic signal and an identity of the internal data processing system component in a failure log; and
seventh instructions for triggering a failure notification.

6. The non-transitory computer usable medium of claim 5, wherein the computer usable program product further comprises:
eighth instructions for capturing the exemplar fingerprint during the running of an exerciser software for the internal data processing system component.

7. The non-transitory computer usable medium of claim 5, wherein the computer usable program product further comprises:
eighth instructions capturing the exemplar fingerprint during the power-on self-test for the data processing system.

8. The non-transitory computer usable medium of claim 5, wherein the internal data processing system component is a plurality of internal data processing system components, the microphone is a plurality of microphones, the acoustic signal is a composite acoustic signal, and the exemplar fingerprint is a composite exemplar fingerprint, wherein the first instructions of the computer usable program product further comprises:
first instructions for selecting the plurality of internal data processing system components for diagnosis, wherein each of the plurality of internal data processing system components are within the data processing system, wherein each of the plurality of the internal data processing system components has one of the plurality of microphones associated with each of the plurality of the internal data processing system components, each of the plurality of microphones being located proximate to the associated each of the plurality of the internal data processing system components.

9. A data processing system comprising:
a bus;
a communications unit connected to the bus;
a storage device connected to the bus, wherein the storage device includes program code for the acoustic monitoring of an internal data processing system component; and
a processor unit connected to the bus, wherein the processor unit executes the program code to select the internal data processing system component for diagnosis, wherein the internal data processing system component is within the data processing system, wherein the internal data processing system component has an associated microphone located proximate to the component; responsive to selecting an internal component for diagnosis, to enable the microphone associated with the internal data processing system component; responsive to enabling the microphone associated with the internal data processing system component, to identify an acoustic signal for the internal data processing system component; to identify an exemplar fingerprint for the internal data processing system component, wherein the exemplar fingerprint is selected from the group consisting of the exemplar fingerprint of a power-on self-test, and the exemplar fingerprint established during a running of an exerciser software for the internal data processing system component; responsive to identifying both the acoustic signal for the internal data processing system component and the exemplar fingerprint for the internal data processing system component, to identify whether the acoustic signal deviates from the exemplar fingerprint by more than a defined statistical variance; responsive to identifying that the acoustic signal deviates from the exemplar fingerprint by more than the defined statistical variance, to store the acoustic signal and an identity of the internal data processing system component in a failure log; and to trigger a failure notification.

10. The data processing system of claim 9, wherein the processor unit further executes the program code to capture the exemplar fingerprint during the running of an exerciser software for the internal data processing system component.

11. The data processing system of claim 9, wherein the processor unit further executes the program code to capture the exemplar fingerprint during the power-on self-test for the data processing system.

12. The data processing system of claim 9, wherein the internal data processing system component is a plurality of internal data processing system components, the microphone is a plurality of microphones, the acoustic signal is a composite acoustic signal, and the exemplar fingerprint is a composite exemplar fingerprint, wherein the processor unit further executes the program code:
to select the plurality of internal data processing system components for diagnosis, wherein each of the plurality of internal data processing system components are within the data processing system, wherein each of the plurality of the internal data processing system components has one of the plurality of microphones associated with each of the plurality of the internal data processing system components, each of the plurality of microphones being located proximate to the associated each of the plurality of the internal data processing system components.

13. The computer implemented method of claim 1, further comprising:
establishing a baseline exemplar fingerprint for a boot process after a power-on self-test has been performed.

14. The computer implemented method of claim 13, further comprising:
loading an operating system after the baseline exemplar fingerprint for the boot process has been established.

15. The computer implemented method of claim 1, further comprising:
loading an operating system after the baseline exemplar fingerprint for the boot process has been established.

16. The computer implemented method of claim 15, further comprising:
after loading the operating system, loading a subsystem exerciser module, wherein the subsystem exerciser module is a software process that simulates various operating conditions for the internal data processing system component.

17. The computer implemented method of claim 16, further comprising:
storing the exercised sound recording before selecting the internal data processing system component for diagnosis, wherein the internal data processing system component is within the data processing system, wherein the internal data processing system component has a microphone associated with the internal data processing system component, the microphone associated with the internal data processing system component being located proximate to the internal data processing system component.

* * * * *